United States Patent
Meyer et al.

(10) Patent No.: US 12,502,853 B2
(45) Date of Patent: Dec. 23, 2025

(54) METHOD FOR THE POST-TREATMENT OF PRINTED 3D OBJECTS

(71) Applicant: MÜHLBAUER TECHNOLOGY GMBH, Hamburg (DE)

(72) Inventors: Sven Meyer, Apensen (DE); Stephan Neffgen, Pinneberg (DE); Sunhild C. Salmen, Hamburg (DE); Jens Träger, Hetlingen (DE)

(73) Assignee: MÜHLBAUER TECHNOLOGY GMBH, Hamburg (DE)

( * ) Notice: Subject to any disclaimer, the term of this patent is extended or adjusted under 35 U.S.C. 154(b) by 64 days.

(21) Appl. No.: 18/686,045

(22) PCT Filed: Sep. 16, 2022

(86) PCT No.: PCT/EP2022/075746
§ 371 (c)(1),
(2) Date: Feb. 23, 2024

(87) PCT Pub. No.: WO2023/046584
PCT Pub. Date: Mar. 30, 2023

(65) Prior Publication Data
US 2024/0375363 A1    Nov. 14, 2024

(30) Foreign Application Priority Data
Sep. 23, 2021 (DE) .................. 10 2021 124 655.5

(51) Int. Cl.
*B08B 3/04* (2006.01)
*B05D 3/00* (2006.01)
(Continued)

(52) U.S. Cl.
CPC .......... *B29C 71/0009* (2013.01); *B05D 3/002* (2013.01); *B05D 3/0254* (2013.01);
(Continued)

(58) Field of Classification Search
CPC ........ B05D 3/002; B05D 3/0254; B08B 3/04; B29C 64/124; B29C 64/35;
(Continued)

(56) References Cited

U.S. PATENT DOCUMENTS

| 11,642,850 B2 | 5/2023 | Diez et al. |
| 2017/0028432 A1 | 2/2017 | Miller |

(Continued)

FOREIGN PATENT DOCUMENTS

| DE | 102018119027 A1 | 2/2020 |
| WO | 2017/062857 | 4/2017 |

(Continued)

OTHER PUBLICATIONS

International Search Report, Application No. PCT/EP2022/075746, dated Jan. 13, 2023, 3 pages.

*Primary Examiner* — Leo B Tentoni
(74) *Attorney, Agent, or Firm* — Casimir Jones, S.C.; Brian F. Bradley

(57) ABSTRACT

The invention relates to a method for the post-treatment of 3D objects (10) printed from a light-curing resin formulation. A 3D object (10) removed from a 3D printer is post-treated according to the following steps: a) exposing the surface (11) of the 3D object (10) to a post-treatment liquid (16) comprising a light-curing resin formulation for a prescribed exposure time, wherein the post-treatment liquid (16) and the exposure time are chosen such that the post-treatment liquid (16) can penetrate into a crack (12) or a pore (13) on the surface (11) of the 3D object within the exposure time as a result of capillarity; b) removing the post-treatment liquid (16) remaining on the surface of the 3D object (10); and c) irradiating the 3D object (10) with light for post-curing the light-curing resin formulation used for the printing of the 3D object (10) and curing the post-treatment liquid (Continued)

Figure 1:
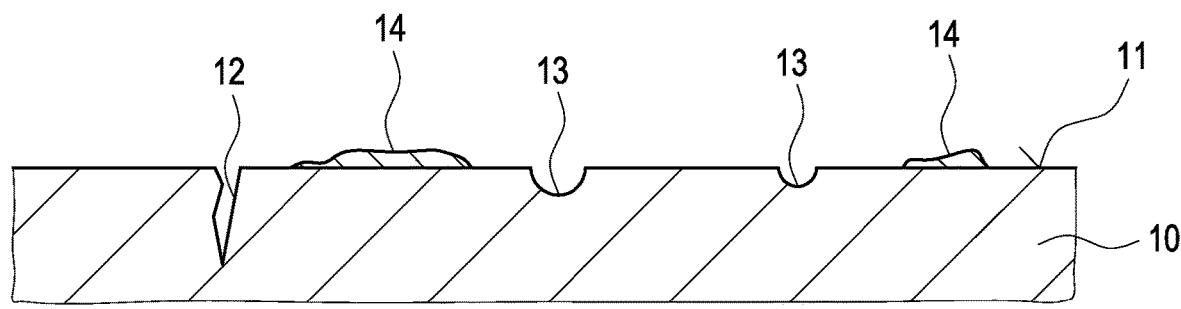
Figure 1:
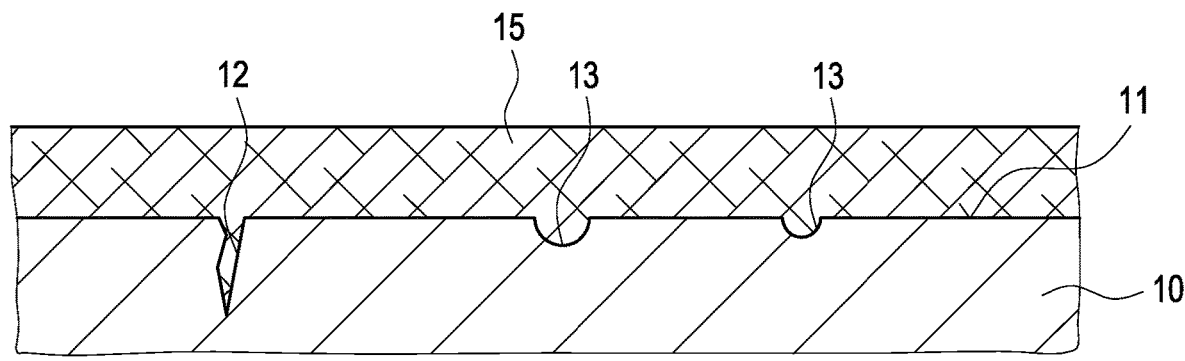
Figure 1:
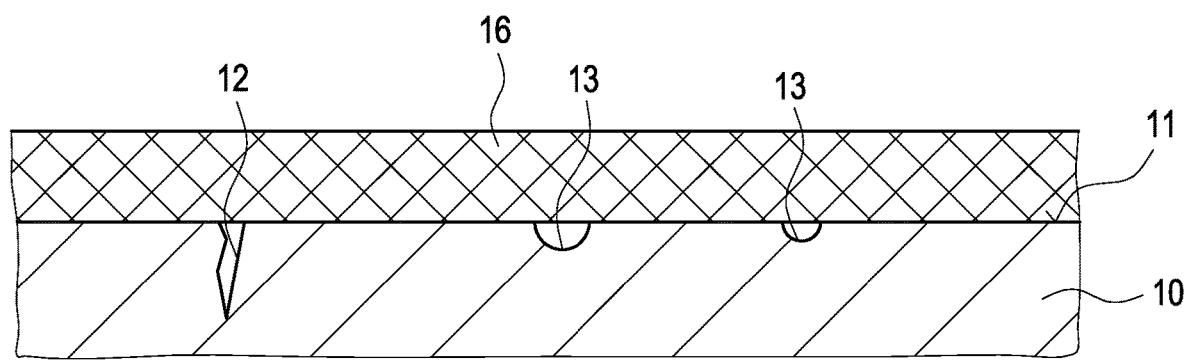
Figure 1:
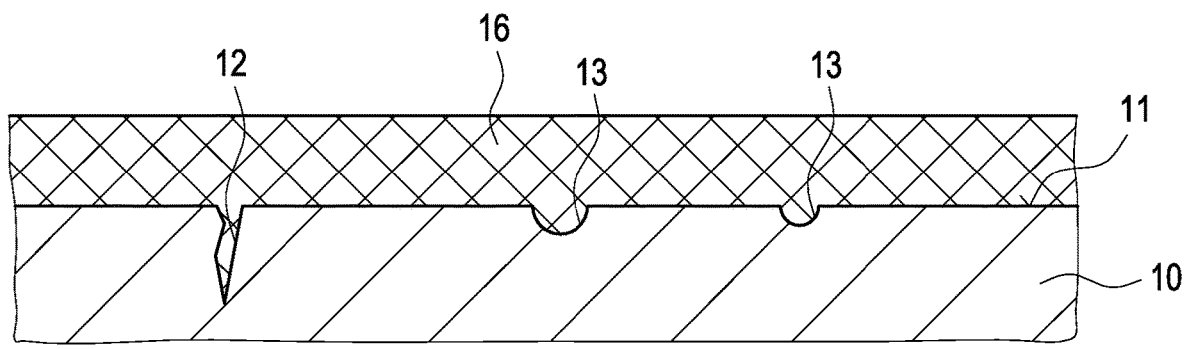
Figure 1:
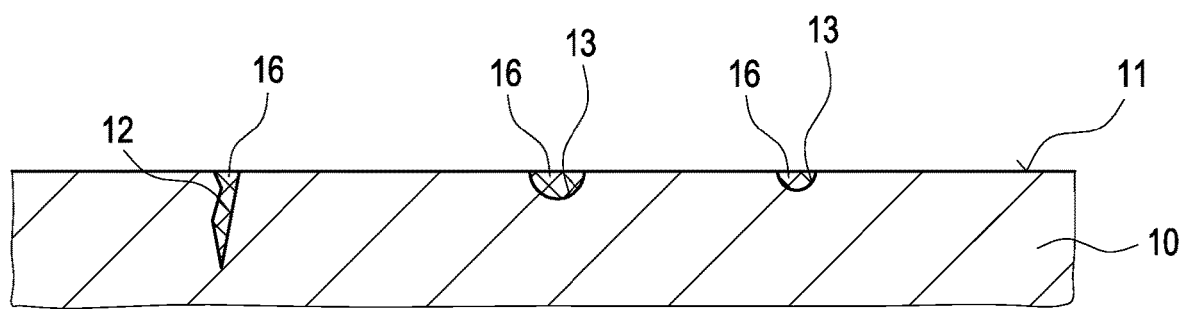
Figure 1:
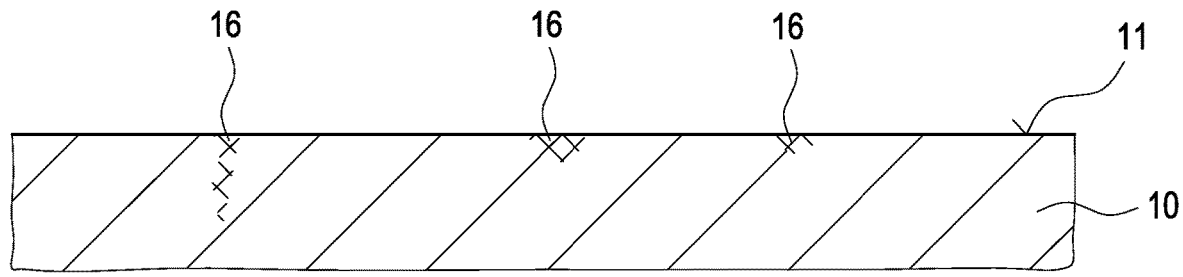

(16) that has penetrated into cracks (12) and/or pores (13) on the surface (11) of the 3D object (10).

20 Claims, 2 Drawing Sheets

(51) Int. Cl.
| | | |
|---|---|---|
| | *B05D 3/02* | (2006.01) |
| | *B29C 64/124* | (2017.01) |
| | *B29C 64/35* | (2017.01) |
| | *B29C 71/00* | (2006.01) |
| | *B29C 71/04* | (2006.01) |
| | *B33Y 10/00* | (2015.01) |
| | *B33Y 40/20* | (2020.01) |

(52) U.S. Cl.
CPC ...... *B29C 71/04* (2013.01); *B29C 2071/0027* (2013.01); *B33Y 40/20* (2020.01)

(58) Field of Classification Search
CPC ........ B29C 71/0009; B29C 2071/0027; B33Y 10/00; B33Y 40/20
USPC .......... 264/129, 134, 233, 255, 331.18, 341, 264/401, 494; 427/299, 553, 601; 134/42
See application file for complete search history.

(56) References Cited

U.S. PATENT DOCUMENTS

| | | | |
|---|---|---|---|
| 2018/0319110 | A1 | 11/2018 | Solgaard et al. |
| 2021/0291449 | A1* | 9/2021 | Andre ................... B29C 64/124 |
| 2022/0134657 | A1* | 5/2022 | Schmidt .................... B08B 3/04 |
| | | | 264/401 |
| 2023/0041524 | A1* | 2/2023 | Lecompere ............ B33Y 10/00 |

FOREIGN PATENT DOCUMENTS

| | | | | |
|---|---|---|---|---|
| WO | 2017/106341 | | 6/2017 | |
| WO | WO-2018060617 A1 * | | 4/2018 | .......... B29C 64/124 |
| WO | 2017/117407 | | 6/2020 | |

* cited by examiner

METHOD FOR THE POST-TREATMENT OF PRINTED 3D OBJECTS

The invention relates to a method of aftertreatment of 3-D objects printed from a light-curing resin formulation.

The prior art discloses 3-D printers of various designs and for different printing methods. A known printing method is the stereolithography method, in which a suitable liquid resin formulation or monomer formulation is cured point-by-point by controlled exposure in order to create a desired three-dimensional object layer-by-layer.

In conventional stereolithography, for this purpose, a focused laser beam is deflected by means of a mirror pivotable about two mutually perpendicular axes in order to scan and hence expose the resin successively at the points to be cured in a layer. Especially when larger areas are to be cured, this method is time-consuming since areas to be cured have to be scanned point by point, i.e. the areas have to be virtually hatched by the laser. There can also be distortions in the edge region in the case of larger objects if the laser hits the resin to be cured only at a shallow angle.

As an alternative, what is called the digital light processing (DLP) printing method was developed. In this method, the light from a light source is directed onto the resin to be cured by means of a digital micromirror unit. This micromirror unit comprises a rectangular arrangement of tiltable micromirrors that are actuatable individually. Typical micromirror units comprise 1920×1080 individual controllable mirrors that can be pivoted between a position in which the incident light is deflected onto a respectively defined point in the resin and a second position in which this does not occur. The number of individually curable points in a layer of the resin is defined by the number of mirrors in the micromirror unit. The ultimate size of the individual points in the resin can be influenced by the distance between the micromirror unit and the layer to be exposed.

The prior art also discloses embodiments in which, rather than a micromirror unit illuminated by a light source, an LCD display backlit by a two-dimensional light source is used in order to cure resin at desired points. The LCD display here, which can selectively allow the backlighting to pass through at individual points, has to be disposed directly atop the layer containing the points to be cured in the otherwise liquid resin.

Because of the resolution of 3-D printers, but also because of fissuring or pore formation at the surface of printed 3-D objects which is not avoidable completely in such 3-D printing methods, it may be necessary, depending on the intended end use, to aftertreat the surface of the 3-D object, especially to grind, jet-blast and/or polish it, in order to obtain a desired surface quality. If a high surface quality is desired, it may be necessary to remove the surface of the 3-D object down to the base of any fissures or pores. Especially when this is performed manually, there is the risk that a printed 3-D object subjected to such aftertreatment no longer conforms accurately to the originally desired shape.

Irrespective of this, the printed 3-D object regularly has to be post-cured prior to grinding, jet-blasting and/or polishing. For this purpose, the printed 3-D object is once again irradiated with light in a wavelength suitable for the curing of the light-curing resin formulation, frequently in the UV range, in order to ensure that the resin formulation has indeed fully cured throughout the 3-D object, meaning that only then is the final hardness of the 3-D object attained.

In the case of objects created from resin formulations with 3-D printers, on removal from the 3-D printers, however, there are regularly still uncured residues of the resin formulation sticking to the objects that absolutely have to be removed before the post-curing, since they would otherwise likewise be cured and lead to a deviation from the originally desired shape of the 3-D object. A known method for this purpose is to treat the 3-D objects with a liquid detergent that chemically removes the uncured residues of the resin formulation without attacking the actual 3-D object or the cured material thereof. For this cleaning too, suitable apparatuses are known, for example, from WO 2020/165430 A1.

If the printed 3-D object, in its later use, is subjected to relatively high stresses, for example because the 3-D object is a tooth replacement or a tooth implant, particles of a filler are added to the resin formulation, as described, for example, in WO 2020/177921 A1, which can distinctly increase the strength of the printed 3-D object.

Since these filler particles regularly cannot be dissolved by the known chemical detergents, the filler particles, in the case of cleaning according to the prior art, remain on the surface of the 3-D object and stick to it. As well as a generally unwanted change in the visual appearance of the 3-D object, the filler particles can also adversely affect the surface shape and properties of the 3-D object.

It is an object of the present invention to provide a method of aftertreatment of 3-D objects printed from a light-curing resin formulation, in which the disadvantages known from the prior art occur only to a reduced degree, if at all.

This object is achieved by a method according to the main claim. Advantageous developments are the subject of the dependent claims.

Accordingly, the invention relates to a method of aftertreatment of 3-D objects printed from a light-curing resin formulation, wherein a 3-D object taken from a 3-D printer is aftertreated by the following steps:

a) exposing the surface of the 3-D object to an aftertreatment fluid comprising a light-curing resin formulation for a given contact time, where the aftertreatment fluid and contact time are chosen such that the aftertreatment fluid can penetrate into a fissure or a pore on the surface of the 3-D object within the contact time owing to capillarity;

b) removing the aftertreatment fluid remaining on the surface of the 3-D object; and c) irradiating the 3-D object with light for post-curing of the light-curing resin formulation used to print the 3-D object and curing the aftertreatment fluid that has penetrated into fissures and/or pores at the surface of the 3-D object.

The invention also relates to a method of printing 3-D objects, in which the method of the invention for aftertreatment follows on as an integral part of the printing procedure.

The invention is based on the finding that exposing the surface of the 3-D object to an aftertreatment fluid for a given period of time allows the aftertreatment fluid to penetrate into any fissures and/or pores that exist at the surface of the 3-D object owing to capillarity and to remain there even after the aftertreatment fluid remaining on the surface of the 3-D object has been removed. By virtue of the subsequent irradiation, not only is the 3-D object post-cured, but the aftertreatment fluid remaining in any fissures and/or pores is also cured. As a result, the method of the invention can achieve improved surface quality. It was also possible to detect increased strength compared to a 3-D object that has been merely post-cured but not exposed to an aftertreatment fluid in accordance with the invention.

The discovery of fundamentally suitable aftertreatment fluid comprising a light-curing resin formulation that can penetrate into fissures and/or pores at the surface of a printed 3-D object owing to capillarity is possible without difficulty for the person skilled in the art, at least within the scope of an acceptable number of tests. Depending on the printing method used and the light-curing resin used therein, the 3-D object has a typical fissure and/or pore size. The aftertreatment fluid can be chosen with regard to this typical fissure and/or pore size, particular factors of relevance for capillarity being the surface tension of the aftertreatment fluid and the interfacial tension between aftertreatment fluid and the surface of the printed 3-D object. The viscosity of the aftertreatment fluid should also be taken into account in respect of the required or desired contact time, since it is only by means of a sufficiently low viscosity that it can be ensured that the aftertreatment fluid does indeed penetrate into fissures and/or pores within the given contact time.

It is incidentally not completely ruled out that individual printed 3-D objects have neither fissures nor pores on their surface after printing. Even though an aftertreatment of the invention may not be absolutely necessary in these special cases, it is unproblematic—partly because such freedom from fissures and pores is detectable only with difficulty—to subject a corresponding 3-D object to the method of the invention. In the case of complete freedom from fissures and pores, the aftertreatment fluid remains completely on the surface and is consequently removed again as well, such that the method in this special case is similar to pure post-curing of the 3-D object. By use of the method of the invention, it is in any case possible to dispense with a separate and possibly complex examination for fissures and/or pores as the basis for immediate post-curing without the treatment with aftertreatment fluid that is envisaged in accordance with the invention, and so it is advisable to always employ the method of the invention.

It is preferable when the surface of the 3-D object, before being exposed to the aftertreatment fluid, is cleaned with a detergent distinct from the aftertreatment fluid to remove residues of uncured or incompletely cured resin formulation adhering to the surface of the 3-D object. A corresponding cleaning operation on printed 3-D objects and detergents suitable for the purpose are known in principle in the prior art. However, the use of corresponding detergents results in the risk that cured resin formulation will be attacked as well and hence existing fissures or pores will be widened and/or new fissures or pores will be created. The latter is especially true when the 3-D object has been printed from a light-curing resin formulation comprising insoluble filler particles which, possibly unlike the resin formulation, are not dissolved by the detergent.

In order to prevent the aftertreatment fluid used after cleaning from being impaired by the detergent, it is preferable when the detergent has completely evaporated or is removed prior to exposure of the 3-D object to aftertreatment fluid.

The detergent may be a volatile organic solvent that preferably comprises isopropanol and/or ethanol. Corresponding detergents have been found to be of particularly good suitability. It is preferable here when the detergent at 23° C. has a volatility index of 1 to 15. Corresponding evaporation ensures that no detergent that could impair the use of the aftertreatment fluid remains on the 3-D object— and especially in the surface fissures or pores thereof—at least after a suitable wait time.

However, it is also possible and particularly preferable when the 3-D object is cleaned with the aftertreatment fluid, i.e. that the exposing of the surface of the 3-D object to the aftertreatment fluid includes cleaning of the surface, for which the aftertreatment fluid has a lower viscosity than the viscosity of residues of uncured or incompletely cured resin formulation used in the 3-D printing that adhere to the surface of the 3-D object. It has been found that, by virtue of suitable choice of the aftertreatment fluid with appropriate viscosity relative to the viscosity of residues of uncured or incompletely cured resin formulation used in the 3-D printing that adhere to the surface of the 3-D object, a more than adequate cleaning action can be achieved without attacking the surface of the 3-D object.

Especially when the aftertreatment fluid is used for cleaning, but in all other cases too, it is possible that the exposing of the surface of the 3-D object to the aftertreatment fluid comprises dipping it into an aftertreatment fluid bath. In the case of cleaning of the surface of the 3-D object with aftertreatment fluid, the aftertreatment fluid bath may preferably be configured as an ultrasound bath or include a stirrer system for washing the 3-D object with aftertreatment fluid. This brings about movement of the aftertreatment fluid across the surface of the 3-D object, which can improve the cleaning action. Especially when there is to be no cleaning with the aftertreatment fluid, as an alternative to immersion into an aftertreatment fluid bath, it is also possible to coat the surface of the 3-D object with aftertreatment fluid. In this case, the viscosity of the aftertreatment fluid inter alia should be chosen such that the aftertreatment fluid adheres on the surface of the 3-D object over the entire contact time defined and does not flow off prematurely.

Irrespective of whether the 3-D object is dipped into the aftertreatment fluid or coated therewith, it should preferably be ensured that the aftertreatment fluid remains over the full surface area of the 3-D object during the defined contact time in order to ensure that the aftertreatment fluid can penetrate into all fissures and/or pores on the surface of the 3-D object.

It is preferable when the removing of the aftertreatment fluid remaining on the surface of the 3-D object and/or the removing of detergent is effected by blowing away the aftertreatment fluid and/or the detergent. The advantage of blowing-away over other conceivable methods of removing liquids adhering to the surface is that liquids that have penetrated into fissures or pores owing to capillarity are regularly not removed by blowing-away (at least in the case of suitable parameters for the blowing-away). The discovery of suitable parameters for the blowing-away does not pose any particular challenges to the person skilled in the art and can be accomplished at least by means of an acceptable number of tests. If the detergent should also be able to penetrate into fissures and/or pores of the 3-D object owing to capillarity, then, as the case may be, a different method of removing the detergent from the fissures and pores as well should be chosen, or complete evaporation of the detergent should be awaited before the aftertreatment fluid is used.

It is preferable when the aftertreatment fluid at 23° C. and a shear rate of $1\ s^{-1}$ has a viscosity of 2 Pa s to 0.005 Pa s, preferably of 1.5 Pa s to 0.01 Pa s, further preferably of 1 Pa s to 0.01 Pa s, where the viscosity in a shear rate range of $0.01\text{-}10\ s^{-1}$ is preferably not more than 10 Pa s, preferably 5 Pa s, more preferably 2 Pa s. Corresponding values have been found to be advantageous for a multitude of applications of the method of the invention. The aforementioned viscosities are ascertained as described hereinafter in association with the working examples. Suitable rheometers are shear stress-controlled rheometers having plate-plate geometry that permit conversion of the measurement data to shear rate-dependent viscosities.

It is preferable when the aftertreatment fluid, or the light-curing formulation, comprises at least one free-radically photopolymerizable monomer, preferably more than one free-radically photopolymerizable monomer and/or at least one additive.

The at least one free-radically photopolymerizable monomer may be selected from the group of the (meth)acrylates, preferably comprising monomers consisting of two or more, preferably two, (meth)acrylate groups and one group which has 2 to 12 carbon atoms and is selected from linear or branched alkyl and alkylene groups, aliphatic cyclic hydrocarbyl groups, polyoxyalkylene groups and a combination of these groups, for example PRDMA, propane-1,3-diol dimethacrylate; BDMA, butane-1,3-diol dimethacrylate; BDDMA, butane-1,4-diol dimethacrylate; PDDMA, pentane-1,5-diol dimethacrylate; NPGDMA, neopentyl glycol dimethacrylate; HDDMA, hexane-1,6-diol dimethacrylate; NDDMA, nonane-1,9-diol dimethacrylate; DDDMA, decane-1,10-diol dimethacrylate; DDDDMA, dodecane-1,12-diol dimethacrylate; PRDA, propane-1,3-diol diacrylate; BDA, butane-1,3-diol diacrylate; BDDA, butane-1,4-diol diacrylate; PDDA, pentane-1,5-diol diacrylate; NPGDA, neopentyl glycol diacrylate; HDDA, hexane-1,6-diol diacrylate; NDDA, nonane-1,9-diol diacrylate; DDDA, decane-1,10-diol diacrylate; DDDDA, dodecane-1,12-diol dimethacrylate; EGDMA, ethylene glycol dimethacrylate; DEGDMA, diethylene glycol dimethacrylate; TEDMA, triethylene glycol dimethacrylate; TEGDMA, tetraethylene glycol dimethacrylate; EGDA, ethylene glycol diacrylate; DEGDA, diethylene glycol diacrylate; TEDA, triethylene glycol diacrylate; TEGDA, tetraethylene glycol diacrylate; PEG200DMA, polyethylene glycol 200 dimethacrylate; PEG300DMA, polyethylene glycol 300 dimethacrylate; PEG400DMA, polyethylene glycol 400 dimethacrylate; PEG600DMA, polyethylene glycol 600 dimethacrylate; PEG200DA, polyethylene glycol 200 diacrylate; PEG300DA, polyethylene glycol 300 diacrylate; PEG400DA, polyethylene glycol 400 diacrylate; PEG600DA, polyethylene glycol 600 diacrylate; PPGDMA, polypropylene glycol dimethacrylate; PPGDA, polypropylene glycol diacrylate; NPG (PO) 2DMA, propoxylated (2) neopentyl glycol dimethacrylate; NPG (PO) 2DA, propoxylated (2) neopentyl glycol diacrylate.

The at least one free-radically photopolymerizable monomer may also be selected from the group of the (meth)acrylates, preferably comprising monomers consisting of a (meth)acrylate group and a radical which has 2 to 12 carbon atoms and is selected from linear or branched alkyl and alkylene groups, aliphatic cyclic hydrocarbyl groups, polyoxyalkylene groups and a combination of these groups, for example EMA, ethyl methacrylate; allyl methacrylate; allyl acrylate; n-BMA, n-butyl methacrylate; IBMA, isobutyl methacrylate, t-BMA, tert-butyl methacrylate; EHMA, 2-ethylhexyl methacrylate; LMA, lauryl methacrylate; TDMA, tridecyl methacrylate; CHMA, cyclohexyl methacrylate; BZMA, benzyl methacrylate; IBOMA, isobornyl methacrylate; HEMA, 2-hydroxyethyl methacrylate; HPMA, 2-hydroxypropyl methacrylate; DMMA, dimethylaminoethyl methacrylate; DEMA, diethylaminoethyl methacrylate; GMA, glycidyl methacrylate; THFMA, tetrahydrofurfuryl methacrylate; ETMA, ethoxyethyl methacrylate; AIB, isobutyl acrylate; TBA, tert-butyl acrylate; LA, lauryl acrylate; CEA, cetyl acrylate; STA, stearyl acrylate; CHA, cyclohexyl acrylate; BZA, benzyl acrylate; IBOA, isobornyl acrylate; 2-MTA, 2-methoxyethyl acrylate; ETA, 2-ethoxyethyl acrylate; EETA, ethoxyethoxyethyl acrylate; PEA, 2-phenoxyethyl acrylate; THFA, tetrahydrofurfuryl acrylate; HEA, 2-hydroxyethyl acrylate; HPA, 2-hydroxypropyl acrylate; 4HBA, 4-hydroxybutyl acrylate; DMA, dimethylaminoethyl acrylate; 3F, trifluoroethyl acrylate; 17F, heptadecafluorodecyl acrylate; 2-PEA, 2-phenoxyethyl acrylate; TBCH, 4-tert-butylcyclohexyl acrylate; DCPA, dihydrodicyclopentadienyl acrylate; EHA, 2-ethylhexyl acrylate; and 3EGMA, triethylene glycol monomethacrylate.

In addition, the at least one free-radically photopolymerizable monomer may be selected from the group of the (meth)acrylates comprising monomer(s) consisting of two or more, preferably two, (meth)acrylate groups and one group comprising at least one group selected from a urethane group, a bisphenol A group, an aliphatic polycyclic group and an oligoester group, for example bis-MA, bisphenol A dimethacrylate; bis-GMA, bisphenol A glycerol dimethacrylate; BPA (EO) DMA, ethoxylated bisphenol A dimethacrylate (EO=1-30); BPA (PO) DMA, propoxylated bisphenol A dimethacrylate (PO=1-30); BPA (EO) DA, ethoxylated bisphenol A diacrylate (EO=1-30); BPA (PO) DA, propoxylated bisphenol A diacrylate (PO=1-30); BPA (PO) GDA, propoxylated bisphenol A-glycerol diacrylate; UDMA, diurethane dimethacrylate; TCDD (M) A and PEM-665.

If more than one free-radically photopolymerizable monomer is provided, the at least two monomers are preferably selected as desired from the monomers listed above.

It is possible in principle that the aftertreatment fluid does not comprise any additives and in particular any (photo) initiators either. In that case, the aftertreatment fluid or the light-curing resin formulation thereof, in the irradiation envisaged in accordance with the invention, can react and cure with (photo) initiators remaining in the region of the surface of the 3-D object.

The aftertreatment fluid may, however, comprise one or more additives in order to influence the properties of the aftertreatment fluid in the uncured and/or cured state. The additive(s) may be selected from the group of the (photo) initiators, stabilizers, dyes and nanoscale fillers. Suitable nanoscale fillers are, for example, comminuted particles of a fumed silica having modified surfaces obtainable in a dispersion process with silanes. Preferred nanoscale fillers have an average particle size of less than 600 nm.

It is preferable that the proportion of additives in the aftertreatment fluid is less than 20% by weight, preferably less than 10% by weight, further preferably less than 5% by weight, further preferably less than 2% by weight.

The aftertreatment fluid may also comprise volatile organic compounds, for example solvents such as ethanol or isopropanol, or volatile monomers such as methyl methacrylate. The proportion of such compounds is preferably less than 5% by weight, further preferably less than 2% by weight.

In principle, it is preferable when the aftertreatment fluid consists to an extent of at least 80% by weight, preferably to an extent of at least 90% by weight, further preferably to an extent of at least 95% by weight, further preferably to an extent of at least 98% by weight, of one or more free-radically polymerizable monomer(s).

It is preferable when the aftertreatment fluid is chosen such that it is subject to immediate concomitant curing on irradiation of the 3-D object for post-curing. In other words, the resin formulation used for the 3-D printing and the resin formulation in the aftertreatment fluid should thus cure at the same wavelength and/or by the same polymerization principle (i.e., for example, both by free-radical polymerization). In this way, the irradiation can be conducted efficiently and generally with devices from the prior art that are suitable for the post-curing of 3-D objects. It is also regularly possible to create a permanent bond between polymerized 3-D object and polymerized aftertreatment agent.

It is a feature of the method of the invention for printing 3-D objects that the 3-D printing of a 3-D object from a light-curing resin formulation is followed by a method according to the details given above.

The 3-D printing can be effected by any method from the prior art, i.e., for example, may be a stereolithography or DLP printing method. By way of elucidation of the subsequent method steps, reference is made to the details given above.

The invention is now described by way of example by advantageous embodiments with reference to the appended drawing. The figures show:

FIG. 1a-f: diagrams of the method of the invention.

Before later addressing specific working examples of 3-D objects aftertreated with the aid of the method of the invention, the principle the method of the invention will first be elucidated with reference to FIG. 1 and an illustrative method sequence.

In a 3-D object 10 printed from a light-curing resin formulation, of which FIG. 1 shows, in each case only in significantly enlarged form, a small surface section in a section view, there are generally already fissures 12 and/or pores 13 at the surface 11 immediately after the 3-D object 10 has been removed from a 3-D printer. In addition, there are also residues 14 of uncured resin formulation from the 3-D printer sticking to the surface 11 (cf. FIG. 1a). The resin formulation of the 3-D object 10 is already basically firm at this juncture, albeit not yet finally cured, and so the 3-D object 10 has not yet reached its final strength. Intensive mechanical processing of the surface 11 of the 3-D object 10 at this stage of the method is therefore not an option.

In order nevertheless to remove the residues 14 of uncured resin formulation, therefore, a liquid detergent 15 is used first of all, which is applied to the surface 11 of the 3-D object 10, and dissolves the residues 14 from the surface 11 (cf. FIG. 1b). The detergent 15 may, for example, be isopropanol or ethanol, which, as shown in FIG. 1b, can also penetrate into the fissures 12 and pores 13. Even though a corresponding detergent is able to efficiently remove residues 14 of uncured resin formulation, there is the risk that the detergent also attacks resin formulation that has properly cured during the 3-D printing, and hence, for example, increases the size of the fissures 12 or pores 13 or even creates new fissures or pores.

The cleaning can therefore preferably also be effected with the aftertreatment fluid 16 described in detail hereinafter. For this purpose, the aftertreatment fluid 16 has a lower viscosity than the viscosity of residues 14 of uncured or incompletely cured resin formulation used in the 3-D printing that adhere to the surface of the 3-D object 10. It has been found that the residues 14, given sufficient contact time and especially given induced movement of the aftertreatment fluid 16 by means of an ultrasound generator or a stirrer system, a sufficient cleaning effect can be achieved. This is also true if, as the case may be, the aftertreatment fluid 16 (unlike the case shown in FIG. 1b) is unable to penetrate directly into the fissures 12 or pores 13, which means that the cleaning effect in these regions is fundamentally limited.

If cleaning was effected with a liquid detergent 15 distinct from the aftertreatment fluid 16, the detergent 15 is first removed completely before the surface 11 of the 3-D object 10 is subsequently exposed over the full area to the aftertreatment fluid 16 (FIG. 1c). Depending on the detergent 15, it is also possible to wait for a certain time until the detergent 15 has evaporated completely.

The aftertreatment fluid 16 comprises a light-curing resin formulation and is chosen such that the aftertreatment fluid 16 penetrates into the fissures 12 and pores 13 as a result of capillarity within a suitably chosen and defined contact time (cf. FIG. 1d). It is directly possible here for the person skilled in the art to discover an aftertreatment fluid 16 with the required properties and to fix a contact time suitable for the aftertreatment fluid 16. For exposure of the 3-D object 10 to the aftertreatment fluid 16, the 3-D object may be coated with the aftertreatment fluid or dipped into a bath of the aftertreatment fluid 16.

After the contact time has elapsed, the aftertreatment fluid 16 remaining on the surface 11 of the 3-D object 10 is blown away with compressed air, leaving the aftertreatment fluid 16 that has penetrated into the fissures 12 and/or pores 13 therein (cf. FIG. 1e).

Finally, the 3-D object 10 is post-cured by irradiation with light in the suitable wavelength for the resin formulation used for printing. If the resin formulation of the aftertreatment fluid 16 has been suitably chosen to cure at the same wavelength, the result is a continuous surface 11 in which previously existing fissures 12 and/or pores 13 have been eliminated (cf. FIG. 1f).

The fundamental principle of the method of the invention that has been illustrated in FIGS. 1a-f was verified by specific working examples.

WORKING EXAMPLES

In each of the working examples and tests conducted that are described hereinafter, a 3-D object is used as test specimen, where the test specimen has a cuboidal shape or the shape of a tooth crown depending on the test to be conducted. The 3-D objects were produced in a known 3-D printer available on the market—namely the "D20 II" model from Rapid Shape GmbH, Heimsheim, Germany—from the "LuxaPrint® ProCB" 3-D printing resin, likewise available on the market, from DMG, Hamburg, Germany. The 3-D printing resin in question contains $SiO_2$ filler particles in a matrix of UDMA (diurethane dimethacrylate), TEDMA (triethylene glycol dimethacrylate), HDDMA (hexane-1,6-diol dimethacrylate), bis-GMA (bisphenol-A-glycerol dimethacrylate), IBOMA (isobornyl methacrylate), Omnirad® TPO (2,4,6-trimethylbenzoyldiphenylphosphine oxide) and additives. "Omnirad® TPO" is a trade name from IGM Resins B. V., Waalwijk, the Netherlands.

In the working examples, the two aftertreatment fluids below are used as alternatives.

The aftertreatment fluid 1 is a mixture of the following components:

| Component | Proportion [% by wt.] |
|---|---|
| TEDMA | 33.97 |
| HDDMA | 23.62 |
| UDMA | 21.23 |
| IBOMA | 19.50 |
| Omnirad ® TPO, IGM Resins | 01.20 |
| Tinuvin ® 622 SF - HALS, BASF | 00.20 |
| TMPM (2,2,6,6-tetramethyl-4-piperidyl methacrylate) | 00.20 |
| BHT (2,6-di-tert-butyl-4-methylphenol) | 00.08 |

"Tinuvin® 622" is poly(4-hydroxy-2,2,6,6-tetramethyl-1-piperidineethanol-alt-butane-1,4-dioic acid). The name "Tinuvin® 622" is a trade name of BASF, Ludwigshafen, Germany.

The mixture of this composition was stirred until the solution was homogeneous.

The aftertreatment fluid 2 used was the commercially available photopolymerizable lacquer "LuxaGlaze®" from DMG, Hamburg, Germany.

The dynamic viscosity of the two aftertreatment fluids was ascertained. For this purpose, a measurement device of the "Kinexus Pro KNX 2100" type from Malvern Instruments Ltd., Malvern, United Kingdom, with a plate-plate geometry at a diameter of 25 mm for the upper plate was used. For the measurement, the shear stress range from 0.01 to 50 Pa was traversed in a logarithmic step method with 2 points per decade, keeping the shear stress constant at each measurement points for a duration of 1.00 min. What are reported in each case are the value of dynamic viscosity ascertained at a shear stress of 50 Pa and at a shear rate of 1 $s^{-1}$. The viscosity at a shear rate of 1 $s^{-1}$ was ascertained by linear interpolation of the viscosity between the respectively adjacent points calculated by the device software along the shear rate scale. The measurement was effected at a constant sample temperature of 23° C., which was monitored by the measurement device.

For the aftertreatment fluid 1, a dynamic viscosity of 16 mPa s was thus found at shear stress 50 Pa and shear rate 1 $s^{-1}$.

The dynamic viscosity of the aftertreatment fluid 2 was found to be 390 mPa s at shear stress 50 Pa and to be 960 mPa s at a shear rate of 1 $s^{-1}$.

In a first series of experiments, flexural strength of test specimens produced for the purpose was tested to ISO 4049:2009. The test specimens were of cuboidal shape with dimensions of x≈40 mm, y=1.9±0.1 mm and z=1.95±0.15 mm; these dimensions were each ascertained after the aftertreatment steps that follow were implemented.

On completion of printing, all test specimens were taken from the 3-D printer with a layer thickness of 0.050 mm and subjected to preliminary cleaning with compressed air. Subsequently, the test specimens were cleaned in an automatic cleaning device of the "3Dewash" type from DMG, Hamburg, Germany, with isopropanol as detergent and dried with compressed air. The support structures remaining from the 3-D printing on one side of the test specimen were removed.

Test specimens from a comparative example 1 were not subjected to an aftertreatment of the invention. Instead, the test specimens, immediately after cleaning, were subjected to post-exposure from all sides in an exposure unit of the "3Decure" type from DMG, Hamburg, Germany, at full light output and a pressure of 50 mbar for 15 minutes. Then the test specimens were aftertreated, in which the binding sites of the support structure on one side of the test specimens were ground, before the complete surface of the test specimens was then polished. The test specimens were then stored in water at 37° C. for 24 hours.

In the case of the test specimens from a working example 1, after removal from the 3-D printer, the aftertreatment fluid 1 was applied to the surface of the test specimens with the aid of a microscale brush. After a contact time of 30 seconds, the aftertreatment fluid 1 present on the surface was blown away by means of compressed air, before the test specimens were then subjected to post-curing, further processing and storage in an identical manner to comparative example 1.

The test specimens from a working example 2 were aftertreated analogously to working example 1, with the sole difference that the aftertreatment fluid 2 was used rather than the aftertreatment fluid 1.

For working example 3, the test specimens were dipped into a dip bath of aftertreatment fluid 1 and removed again after a contact time of 30 seconds. Immediately thereafter, the aftertreatment fluid 1 on the surface was blown away by means of compressed air, before the test specimens were then subjected to post-curing, further processing and storage in an identical manner to comparative example 1.

For the test specimens thus produced from comparative example 1 and working examples 1 to 3, flexural strength was then ascertained to ISO 4049:2009. The measurements were effected on "Z010" or "Z2.5" universal testers from ZwickRoell GmbH & Co. KG, Ulm, Germany, at a constant advance rate of 0.8 mm/min until fracture. For the three-point load specified in ISO 4049:2009, a bending device provided for the purpose with steel rolls in a parallel arrangement was used, using two steel rolls of diameter 2 mm and at an axial separation of 20 mm as base and a third steel roll of diameter 2 mm as die in the middle between the two other steel rolls. If a cuboidal test specimen is deflected until fracture, the formula $$\sigma = \frac{3\,F\,l}{2\,b\,h^2}$$

gives the flexural strength σ, where F is the maximum force exerted on the test specimen (in newtons), l is the support width, i.e. the distance between the first and second steel rolls (in mm), b is the width of the test specimen before the test (in mm) and h is the height of the test specimen before the test (in mm).

Various test series were conducted for comparative example 1 and working examples 1 to 3. In a first test series 1, the test specimens from comparative example 1, working example 1 and working example 2 were each placed into the bending apparatus with the ground side on which the support structure originating from the 3-D printing was disposed upward, i.e. facing the third steel roll. In the second test series 2, the test specimens of comparative example 1, working example 1 and working example 3 were each inserted into the bending apparatus with the said ground side downward, i.e. facing the first and second steel rolls. For each comparative example or working example, six test specimens were examined in each case, which gave the following picture:

|  | Test series 1 Flexural strength [MPa] | Test series 2 Flexural strength [MPa] |
|---|---|---|
| Comparative example 1 | 67.6 ± 19 | 62.2 ± 6.83 |
| Working example 1 | 108 ± 13.8 | 113 ± 11.5 |
| Working example 2 | 102 ± 7.83 | — |
| Working example 3 | — | 99.58 ± 17.84 |

As is immediately apparent, the test specimens or 3-D objects aftertreated by the method of the invention have a distinct improvement in flexural strength compared to test specimens without corresponding aftertreatment.

In a further test series, the dimensional accuracy of printed tooth crowns on employment of the method of the invention was verified.

For this purpose, identical tooth crowns were created by 3-D printing with a layer thickness of 0.05 mm, with a support structure on the occlusal face. The support structure was removed and the tooth crowns were subjected to preliminary cleaning with compressed air.

The tooth crown from a comparative example 2 was treated analogously to comparative example 1. Immediately after cleaning in an automatic cleaning device of the "3Dewash" type from DMG, Hamburg, Germany, with isopropanol as detergent and subsequent drying with compressed air, the tooth crown was thus subjected to further exposure from all sides in an exposure unit of the "3Decure" type from DMG, Hamburg, Germany, at full light power and a pressure of 50 mbar for 15 minutes. The tooth crown was then aftertreated, in which the occlusal face of the tooth crown—i.e. the face to which the support structure was bound—was ground, before the complete surface of the tooth crown was then polished. The tooth crown was then stored in water at 37° C. for 24 hours.

In the case of the tooth crown of comparative example 3, the tooth crown, by contrast with comparative example 2, was cleaned not in an automatic cleaning device but merely with a cloth and isopropanol. The subsequent post-exposure, further processing and storage were then once again analogous to comparative example 2 and hence also to comparative example 1.

The tooth crown of comparative example 4, after preliminary cleaning with a cloth, was cleaned with a microbrush and ethanol. The subsequent post-exposure, further processing and storage were analogous to the other comparative examples 1 to 3.

The tooth crown from a working example 4 was cleaned and aftertreated corresponding to working example 1.

The tooth crown from a working example 5 was cleaned and aftertreated corresponding to working example 2.

In a working example 6, the tooth crown, for cleaning purposes, was first placed into an ultrasound dip bath of 50 ml of TEDMA as aftertreatment fluid for 3 minutes, with the tooth crown completely surrounded by the aftertreatment fluid. Subsequently, the tooth crown was removed, cleaned briefly with compressed air and then placed again into an ultrasound bath of 50 ml of TEDMA for two minutes. This was "fresh" TEDMA, and not, for instance, the aftertreatment fluid used previously for cleaning. Subsequently, the tooth crown was removed, and the aftertreatment fluid still adhering on the surface of the tooth crown was blown away with compressed air. The subsequent post-exposure, further processing and storage were analogous to the other comparative/working examples.

In order to verify dimensional accuracy, some of the comparative and working examples were measured with a 3-D scanner of the "ATOS Core" type from GOM GmbH, Braunschweig, Germany, after they had been rendered detectable by the 3-D scanner by spraying with the "Nord-Test Entwickler U89" from Helling GmbH, Heidgraben, Germany. The scan data were evaluated on the basis of the 3-D data used for 3-D printing (here in STL data format). In order to determine dimensional accuracy, the percentile of the area below a variance of ±60 μm compared to the 3-D data was ascertained.

The dimensional accuracy of comparative example 2 and of working example 6 can be assessed as being very good at 94.1% and 95.8% respectively. By contrast, the dimensional accuracy of comparative example 3 is low at only 86.9%. Elevations in particular (of up to 0.5 mm) on the inner surfaces of the tooth crown of comparative example 3, which suggest incomplete removal of 3-D printing resin adhering to the crown, which has been cured by the post-exposure, make the tooth crown virtually unusable. The same applies to comparative example 4, in which comparable elevations were detected. Just like comparative example 2 and working example 6, working examples 4 and 5 do not show any such elevations either. In view of visual comparisons between the tooth crowns from the various comparative and working examples, even without 3-D detection of working examples 4 and 5 that was dispensed with for reasons of expediency, good dimensional accuracy of these working examples can be assumed.

Even though comparative example 2 achieves good dimensional accuracy, the surface quality of comparative example 2 is inadequate. Thus, white deposits and fissures are apparent by the naked eye on the surface of the tooth crown. The surface of working examples 4 to 6, by contrast, can be described as very good. Thus, there are neither deposits nor fissures. Nor are any other faults on the surface apparent.

The invention claimed is:

1. A method of aftertreatment of 3-D objects (10) printed from a light-curing resin formulation, wherein a 3-D object (10) taken from a 3-D printer is aftertreated by the following steps:
   a) exposing a surface (11) of the 3-D object (10) to an aftertreatment fluid (16) comprising a light-curing resin formulation for a given contact time, where the aftertreatment fluid (16) and contact time are chosen such that the aftertreatment fluid (16) can penetrate into a fissure (12) or a pore (13) on the surface (11) of the 3-D object (10) within the contact time owing to capillarity;
   b) removing the aftertreatment fluid (16) remaining on the surface of the 3-D object (10); and
   c) irradiating the 3-D object (10) with light for post-curing of the light-curing resin formulation used to print the 3-D object (10) and curing the aftertreatment fluid (16) that has penetrated into fissures (12) and/or pores (13) at the surface (11) of the 3-D object (10);
   wherein the exposing of the surface (11) of 3-D object (10) to the aftertreatment fluid (16) comprises a coating of the surface (11) of the 3-D object (10) with aftertreatment fluid (16) or dipping it into an aftertreatment fluid bath; and
   wherein in the case of cleaning of the surface (11) of the 3-D object (10) with aftertreatment fluid (16), the aftertreatment fluid bath is configured as an ultrasound bath or has a stirrer system for washing the 3-D object (10) with aftertreatment fluid (16).

2. The method as claimed in claim 1,
characterized in that
the surface (11) of the 3-D object (10), before being exposed to the aftertreatment fluid (16), is cleaned with a detergent (15) distinct from the aftertreatment fluid (16) to remove residues (14) of uncured or incompletely cured resin formulation adhering to the surface of the 3-D object.

3. The method as claimed in claim 2,
characterized in that
the detergent (15) is a volatile organic solvent.

4. The method as claimed in claim 3,
characterized in that
the detergent (15) at 23° C. has a volatility index of 1 to 15.

5. The method as claimed in claim 1,
characterized in that
the exposing of the surface (11) of the 3-D object (10) to the aftertreatment fluid (16) includes cleaning of the surface (11), for which the aftertreatment fluid (16) has a lower viscosity than a viscosity of residues (14) of uncured or incompletely cured resin formulation used in the 3-D printing that adhere to the surface of the 3-D object (10).

6. The method as claimed in claim 1, characterized in that a removing of the aftertreatment fluid (16) remaining on the surface of the 3-D object (10) and/or a removing of detergent (15) is effected by blowing away the aftertreatment fluid (16) and/or the detergent (15).

7. The method as claimed in claim 1, characterized in that the aftertreatment fluid (16) at 23° C. and a shear rate of 1 $s^{-1}$ has a viscosity of 2 Pa s to 0.005 Pa s.

8. The method as claimed in claim 1, characterized in that the aftertreatment fluid (16) comprises at least one free-radically photopolymerizable monomer.

9. The method as claimed in claim 8, characterized in that the at least one free-radically photopolymerizable monomer is selected
from the group of the (meth)acrylates, comprising monomers consisting of two of two or more, (meth) acrylate groups and one group which has 2 to 12 carbon atoms and is selected from linear or branched alkyl and alkylene groups, aliphatic cyclic hydrocarbyl groups, polyoxyalkylene groups and a combination of these groups;
from the group of the (meth)acrylates, comprising monomers consisting of a (meth)acrylate group and a radical which has 2 to 12 carbon atoms and is selected from linear or branched alkyl and alkylene groups, aliphatic cyclic hydrocarbyl groups, polyoxyalkylene groups and a combination of these groups; and/or
from the group of the (meth)acrylates comprising monomer(s) consisting of two or more, (meth)acrylate groups and one group comprising at least one group selected from a urethane group, a bisphenol A group, an aliphatic polycyclic group and an oligoester group.

10. The method as claimed in claim 1, characterized in that the aftertreatment fluid (16) comprises at least one additive.

11. The method as claimed in claim 10, characterized in that the aftertreatment fluid (16) comprises one or more additives, selected from the group of (photo)initiators, stabilizers, dyes and nanoscale fillers.

12. The method as claimed in claim 1, characterized in that the 3-D object (10) is composed of a light-curing resin formulation for 3-D printing comprising 5% to 65% by weight of insoluble filler particles.

13. The method as claimed in claim 1, characterized in that the aftertreatment fluid is chosen such that it is subject to immediate concomitant curing on irradiation of the 3-D object for post-curing.

14. A method of printing 3-D objects, in which a 3-D printing of a 3-D object from a light-curing resin formulation is followed by a method as claimed in claim 1.

15. The method as claimed in claim 2, characterized in that the detergent (15) has completely evaporated or is removed prior to exposure of the 3-D object (10) to the aftertreatment fluid (16).

16. The method as claimed in claim 7, characterized in that the aftertreatment fluid (16) at 23° C. and a shear rate of 1 $s^{-1}$ has a viscosity of 1.5 Pa s to 0.01 Pa s.

17. The method as claimed in claim 7, characterized in that the viscosity in a shear rate range of 0.01-10 $s^{-1}$ is not more than 10 Pa s.

18. The method as claimed in claim 8, characterized in that aftertreatment fluid (16) comprises more than one free-radically photopolymerizable monomer.

19. The method as claimed in claim 9, characterized in that the at least one free-radically photopolymerizable monomer is selected
from the group consisting of: PRDMA, propane-1,3-diol dimethacrylate; BDMA, butane-1,3-diol dimethacrylate; BDDMA, butane-1,4-diol dimethacrylate; PDDMA, pentane-1,5-diol dimethacrylate; NPGDMA, neopentyl glycol dimethacrylate; HDDMA, hexane-1,6-diol dimethacrylate; NDDMA, nonane-1,9-diol dimethacrylate; DDDMA, decane-1,10-diol dimethacrylate; DDDDMA, dodecane-1,12-diol dimethacrylate; PRDA, propane-1,3-diol diacrylate; BDA, butane-1,3-diol diacrylate; BDDA, butane-1,4-diol diacrylate; PDDA, pentane-1,5-diol diacrylate; NPGDA, neopentyl glycol diacrylate; HDDA, hexane-1,6-diol diacrylate; NDDA, nonane-1,9-diol diacrylate; DDDA, decane-1,10-diol diacrylate; DDDDA, dodecane-1,12-diol dimethacrylate; EGDMA, ethylene glycol dimethacrylate; DEGDMA, diethylene glycol dimethacrylate; TEDMA, triethylene glycol dimethacrylate; TEGDMA, tetraethylene glycol dimethacrylate; EGDA, ethylene glycol diacrylate; DEGDA, diethylene glycol diacrylate; TEDA, triethylene glycol diacrylate; TEGDA, tetraethylene glycol diacrylate; PEG200DMA, polyethylene glycol 200 dimethacrylate; PEG300DMA, polyethylene glycol 300 dimethacrylate; PEG400DMA, polyethylene glycol 400 dimethacrylate; PEG600DMA, polyethylene glycol 600 dimethacrylate; PEG200DA, polyethylene glycol 200 diacrylate; PEG300DA, polyethylene glycol 300 diacrylate; PEG400DA, polyethylene glycol 400 diacrylate; PEG600DA, polyethylene glycol 600 diacrylate; PPGDMA, polypropylene glycol dimethacrylate; PPGDA, polypropylene glycol diacrylate; NPG(PO)2DMA, propoxylated (2) neopentyl glycol dimethacrylate; NPG(PO)2DA, propoxylated (2) neopentyl glycol diacrylate;
from the group consisting of: EMA, ethyl methacrylate; allyl methacrylate; allyl acrylate; n-BMA, n-butyl methacrylate; IBMA, isobutyl methacrylate, t-BMA, tert-butyl methacrylate; EHMA, 2-ethylhexyl methacrylate; LMA, lauryl methacrylate; TDMA, tridecyl methacrylate; CHMA, cyclohexyl methacrylate; BZMA, benzyl methacrylate; IBOMA, isobornyl methacrylate; HEMA, 2-hydroxyethyl methacrylate; HPMA, 2-hydroxypropyl methacrylate; DMMA, dimethylaminoethyl methacrylate; DEMA, diethylaminoethyl methacrylate; GMA, glycidyl methacrylate; THFMA, tetrahydrofurfuryl methacrylate; ETMA, ethoxyethyl methacrylate; AIB, isobutyl acrylate; TBA, tert-butyl acrylate; LA, lauryl acrylate; CEA, cetyl acrylate; STA, stearyl acrylate; CHA, cyclohexyl acrylate; BZA, benzyl acrylate; IBOA, isobornyl acrylate; 2-MTA, 2-methoxyethyl acrylate; ETA, 2-ethoxyethyl acrylate; EETA, ethoxyethoxyethyl acrylate; PEA, 2-phenoxyethyl acrylate; THFA, tetrahydrofurfuryl acrylate; HEA, 2-hydroxyethyl acrylate; HPA, 2-hydroxypropyl acrylate; 4HBA, 4-hydroxybutyl acrylate; DMA, dimethylaminoethyl acrylate; 3F, trifluoroethyl acrylate; 17F, heptadecafluorodecyl acrylate; 2-PEA, 2-phenoxyethyl acrylate; TBCH, 4-tert-butylcyclohexyl acrylate; DCPA, dihydrodicyclopentadienyl acrylate; EHA, 2-ethylhexyl acrylate; and 3EGMA, triethylene glycol monomethacrylate; and/or from the consisting of: bis-MA, bisphenol A dimethacrylate; bis-GMA, bisphenol A glycerol dimethacrylate; BPA(EO)DMA, ethoxylated bisphenol A dimethacrylate (EO=1-30); BPA(PO)DMA, propoxylated bisphenol A dimethacrylate (PO=1-30); BPA(EO)DA, ethoxylated bisphenol A diacrylate (EO=1-30); BPA(PO)DA, propoxylated bisphenol A diacrylate (PO=1-30); BPA(PO)GDA, propoxylated bisphenol A-glycerol diacrylate; UDMA, diurethane dimethacrylate; TCDD(M)A and PEM-665.

20. The method as claimed in claim 3, characterized in that the detergent (15) is a volatile organic solvent comprising isopropanol and/or ethanol.

\* \* \* \* \*